United States Patent
Folk et al.

(10) Patent No.: US 7,716,953 B2
(45) Date of Patent: May 18, 2010

(54) METHOD AND ASSEMBLY FOR FIBERIZING MOLTEN GLASS

(75) Inventors: Michael David Folk, Oregon, OH (US); Douglas J. Kempski, Holland, OH (US)

(73) Assignee: Johns Manville, Denver, CO (US)

( * ) Notice: Subject to any disclaimer, the term of this patent is extended or adjusted under 35 U.S.C. 154(b) by 1029 days.

(21) Appl. No.: 11/320,134

(22) Filed: Dec. 28, 2005

(65) Prior Publication Data

US 2007/0144217 A1    Jun. 28, 2007

(51) Int. Cl.
*C03B 37/02* (2006.01)
*C03B 37/10* (2006.01)

(52) U.S. Cl. ............... 65/475; 65/479; 65/533; 65/539

(58) Field of Classification Search ........... 65/471–482, 65/483–540; 75/952; 29/419.1
See application file for complete search history.

(56) References Cited

U.S. PATENT DOCUMENTS

| | | | |
|---|---|---|---|
| 2,835,221 A * | 5/1958 | De Piolenc et al. | 118/202 |
| 3,432,580 A | 3/1969 | Heidrich et al. | |
| 3,516,809 A * | 6/1970 | Palmer et al. | 65/484 |
| 3,905,790 A | 9/1975 | Strickland | |
| 4,036,622 A * | 7/1977 | Carroll et al. | 65/377 |
| 4,078,413 A | 3/1978 | McCormick et al. | |
| 4,130,406 A | 12/1978 | Wakasa et al. | |
| 4,207,086 A | 6/1980 | Heitmann et al. | |
| 4,229,198 A | 10/1980 | Coggin, Jr. et al. | |
| 4,342,579 A | 8/1982 | Sanders | |
| 4,401,452 A | 8/1983 | Eisenberg | |
| 4,526,598 A | 7/1985 | Reese et al. | |
| 4,692,178 A | 9/1987 | Smith, Jr. et al. | |
| 4,925,471 A | 5/1990 | Yamatsuta | |

OTHER PUBLICATIONS

Danaher Motion, 'Servodisc', [online].Copyright 2000 [retrieved on Feb. 11, 2009]. retrieved from the internet:<URL:http://www.danahermotion.com/website/usa/eng/products/motors/121546.php> (referred to as "Danaher Motion" herein after).*

* cited by examiner

*Primary Examiner*—Steven P Griffin
*Assistant Examiner*—Jodi Cohen
(74) *Attorney, Agent, or Firm*—Robert D. Touslee

(57) ABSTRACT

Apparatus and methods for making a continuous fiber product by gathering a plurality of fibers into a strand in contact with a pad wheel that is driven with a low voltage, variable speed motor or drive, and controlling the RPM of the motor in response to a breakout detector. Other embodiments further include accelerating the RPM of the motor and pad wheel at a desired ramp-up rate following the resumption of desired fiberization.

14 Claims, 2 Drawing Sheets

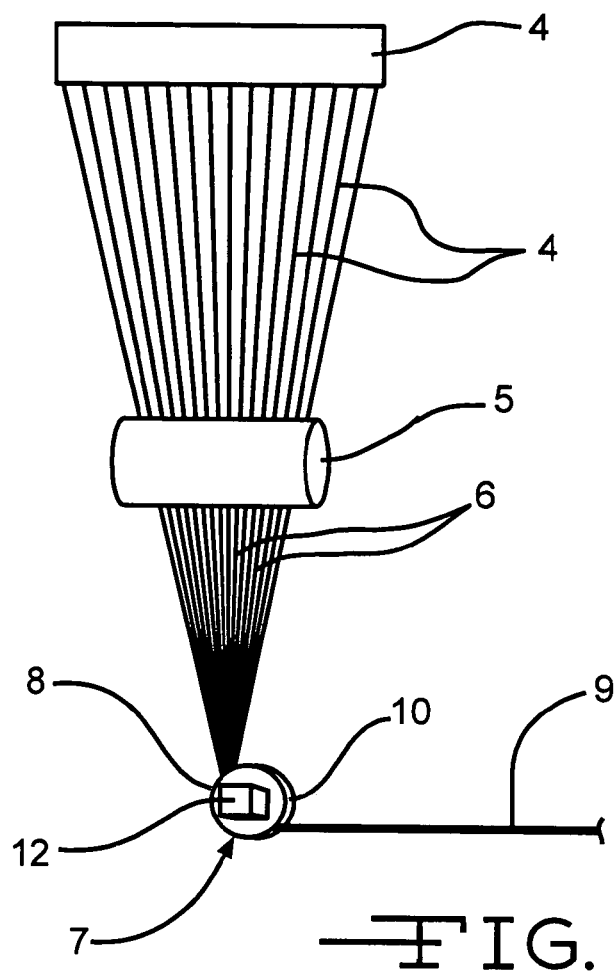
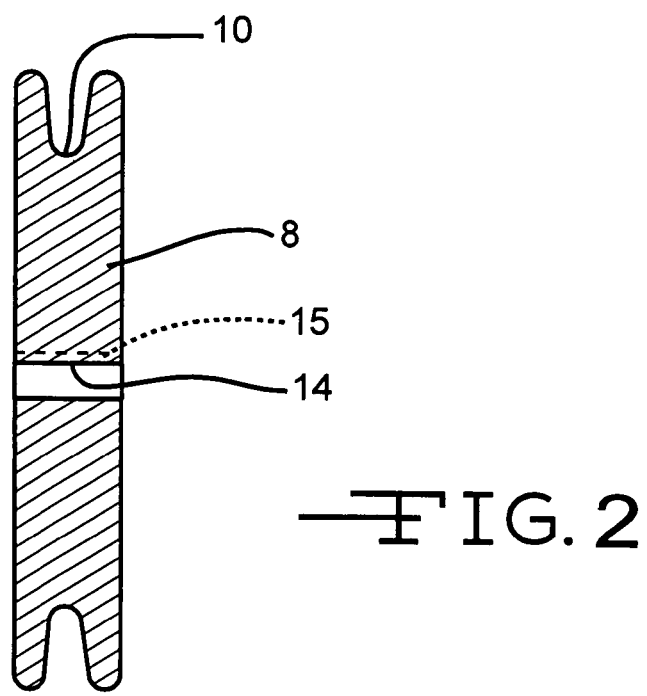

METHOD AND ASSEMBLY FOR FIBERIZING MOLTEN GLASS

The invention involves an improved apparatus for, and method of, making fiber from a molten material and more particularly an improved fiber strand gathering and turning device.

BACKGROUND

In the manufacture of mineral fiber from molten material, it has been common practice to use a bushing made of precious metals including platinum, rhodium, palladium, ruthenium, iridium and alloys thereof. The bushings are electrically heated by their own resistance and are usually box-like, open on the top and comprise an orifice plate containing hundreds or thousands of orifices, with or without nozzles or tips welded or formed thereon, as shown by U.S. Pat. Nos. 4,207,086 and 4,078,413, which disclosures are hereby incorporated by reference. It is also known in flat plate bushings having no tips or nozzles such as disclosed in U.S. Pat. Nos. 3,905,790 and 4,229,198

Occasionally, and sometimes frequently, a fiber will break beneath the bushing for various reasons that are known. When a fiber break occurs, the loose fiber soon causes other fibers to break and soon all, or most, fibers being formed beneath the bushing are broken, a stoppage of desired fiberization. This is called a "breakout" in the industry. After a breakout begins, it is necessary to wait a short time, usually tens of seconds up to a few minutes, for beads of molten glass to form beneath each bushing orifice or tip, and become large enough that they break loose and fall from the bottom of the orifice plate or tip pulling a very coarse fiber, called a primary fiber, onto the floor, into a scrap bin, basement or scrap bin beneath the forming room floor. This is normally called "beading out" in the industry. Once beaded out, or as soon as the operator is available, the operator or starting equipment can then restart a strand containing the primary fibers into a chopper or winder and again begin making the desired product. Detectors for detecting when a breakout is occurring, and when desired fiberization is occurring, are known as evidenced by U.S. Pat. Nos. 4,130,406, 4,229,198, 4,342,579, 3,432,580, 4,401,452, and 4,925,471.

During normal operation of the bushing to make fiber products the fibers move away from the bushing at a high speed of thousands of feet per minute. The fibers are gathered into a strand of fibers, and the path of the strand is also often turned from a downward direction to a generally horizontal direction, using a pad wheel, a gathering wheel or shoe, hereinafter all referred to as a pad wheel. Some pad wheels are stationary and are simply rotated several degrees at frequent intervals to prevent wearing a flat place on the pad wheel. The fiber strand rubbing around 20-90 degrees of a stationary pad wheel substantially increases tension in the fiber strands versus a turning or rotating pad wheel. To reduce tension on the fiber strands, most pad wheels turn, but are plagued by what is referred to in the industry as strand wrap on the pad wheel. Strand wrap occurs because the fibers, being wet and usually also having a chemical sizing on the surface, tend to stick to the surface of the pad wheel and when the sticking becomes excessive, due to drying of residue on the wheel to tackiness, fibers tend to stay on the rotating wheel and wrap around the wheel. When this occurs the bushing has to be broken out, fiberization interrupted, the pad wheel cleaned and the bushing restarted making good fiber product. While an operator is tending to this time consuming act, other things needed doing are left undone and this causes additional bushing breakouts and lost production. Pad wheel wraps cause costly problems including scrap problems, quality problems and lost production.

U.S. Pat. No. 4,526,598 discusses the pad wheel wrap problem and discloses a rotating a rotating pad wheel designed to try to avoid pad wheel wrap. This pad wheel appears to be driven with a conventional motor, 120 volts, but there is no disclosure of RPM, driven direction or whether always driven. U.S. Pat. No. 4,692,178 discloses a pad wheel comprising a rotatable, generally disc-shaped hub that is provided with walls for supporting a plurality of generally cylindrical rods about the hub's peripheral edge with the rods spaced apart to provide surface contact reductions of more than 70 percent and up to as much as 95 percent. This latter pad wheel is free wheeling, i.e. driven by the moving fiber strands. Both pad wheels are or appear to be an improvement over what came before, but still have short-comings, particularly in how they are driven. The use of 120 volt motors in a forming room environment is dangerous because of the frequent or constant wet conditions around the pad wheel and have a short life in these conditions. On the other hand, a free wheeling pad wheel causes more tension on the fiber strands than necessary and, does not slow down quickly or stop quickly.

SUMMARY

The device of the invention comprises a pulley, pad wheel, having a grove around an outside periphery, a shaft for the pulley and a low voltage servo motor to turn the pulley. The groove can be any reasonable shape, but most typically is V or U shaped with the bottom of the V or U being closer to the axis of the pulley than the outer edges of the pulley. The bottom of the V is most typically radiused with the radius being in the range of about 0.0625 inch to about 0.250 inch. The device can be mounted in the desired position at a lower elevation than the bottom of a fiberizing bushing and spaced from the free fall path of primary fibers produced by the bushing. The mount can be attached to the servo motor or can be a plate or bracket to which the motor is attached. The shaft passes through an opening or open area of the mount such that the shaft is free to turn. By low voltage is meant a voltage of less than about 50 volts and most typically is about 24 volts, but other voltages below about 50 volts can be used. Using a low voltage motor results in a far safer system than the 110 volt AC motors suggested heretofore for use on driven pad wheels. Alternating current or direct current, variable speed motors or variable speed drives are suitable for the invention, and most desirable is a 24 volt, direct current, servo motor with a programmable controller for controlling the shaft speed in response to one or more sensors sensing a hanging mode and a desired fiberization mode.

The pulley is referred to as a pad wheel because originally in the industry pads containing a lubricant were used to gather the fibers from a bushing into a strand and turn the strand towards a winder. Direct chopping of the fiber was not developed until years later. In time the pads were replaced with a wheel like a pulley wheel and these were called pad wheels. This name has remained since, at least with some fiber manufacturers.

The device of the invention is driven, but is safer than previous driven gathering and turning pad wheels due to the lower voltage. Also, the device of the invention has lower maintenance that previous driven pad wheels because a servo motor is more reliable and durable in the harsh environment of a typical fiber forming room due to the presence of heat, wetness, and constant use. Another advantage is the ability of the device to operate differently during a breakout of the bushing than it does during normal operation. All too often during operation a fiber will break beneath the bushing for various reasons that are known. When a fiber break occurs, the broken loose fiber soon causes other fibers to break and soon all, or most, fibers being formed beneath the bushing are broken, a stoppage of desired fiberization. At such time, it is necessary to wait a short time, usually tens of seconds up to a few minutes, for beads of molten glass to form beneath each bushing orifice or tip, and become large enough that they break loose and fall from the bottom of the orifice plate or tip pulling a very coarse fiber, called a primary fiber, onto the floor, into a scrap bin, basement or scrap bin beneath the forming room floor. This is normally called "beading out" in the industry. Once beaded out, or as soon as the operator is available, the operator or starting equipment can then restart a strand containing the primary fibers into a chopper or winder and again begin making the desired product.

By "fiberizing" is meant the condition where fibers are being pulled from a bushing at a speed similar to that produced by a product-forming machine like a chopper or winder, usually at more than 1000 feet per minute. By beading out or breaking out is meant the mode from the time the first fiber breaks out, or from the time the operator or sensor senses that one or more fibers have broken out, until every operable tip has formed a bead of molten glass at the end of the tip, usually so heavy enough that it has fallen away from the tip to form a primary fiber. If one or more tips of the bushing are cold, i.e. cooler than the other tips, for some reason, those few tips will bead very slowly and need not be running a primary fiber for the bushing to be in the hanging mode. By "hanging" is meant a condition or mode where the fibers from the bushing have broken out and the bushing is in the mode where all or almost all of the operating tips are producing coarse, primary fibers and those primary fibers are moving downward due to their own weight, or are being pulled slowly by pull rolls, usually into a waste collection system or waste hopper. Thereafter, until the desired fiberization is restarted, i.e. all or most of the primary fibers from the bushing are inserted into a high-speed pulling device like a winder or a chopper, the bushing remains in a hanging mode.

The invention also comprises a method of making a fiber product from a molten material comprising passing a molten material through a bushing comprising an orifice plate or a tip plate having a plurality of orifices therein, forming a plurality of fibers, gathering the fibers into a strand using a driven pad wheel and turning, changing direction, the strand of fibers towards a winder or a chopper, the improvement comprising using as a gathering device a servo motor driven pad wheel, sensing when the bushing is breaking out and when the bushing is fiberizing and changing the RPM of the pad wheel to slow down the pad wheel when the bushing is breaking out and to speed up the pad wheel once the bushing is again fiberizing.

The present invention is applicable to any system or bushing that converts molten material to continuous fibers and particularly to systems and bushings that operate at temperatures above 1000 degrees F. Materials suitable for converting in the present invention are polymers, metals and mineral materials including glasses, ceramic compounds or mixtures of ceramic materials, slags and the like. The invention is particularly useful in making continuous glass fibers and products made using such fibers. While the invention is applicable to any glass used to make fibers, E glass is the most common glass used to make continuous fiber.

When the word "about" is used herein it is meant that the amount or condition it modifies can vary some beyond that stated so long as the advantages of the invention are realized. Practically, there is rarely the time or resources available to very precisely determine the limits of all the parameters of ones invention because to do would require an effort far greater than can be justified at the time the invention is being developed to a commercial reality. The skilled artisan understands this and expects that the disclosed results of the invention might extend, at least somewhat, beyond one or more of the limits disclosed. Later, having the benefit of the inventors disclosure and understanding the inventive concept, the objectives of the invention and embodiments disclosed, including the best mode known to the inventor, the inventor and others can, without inventive effort, explore beyond the limits disclosed using only ordinary skill to determine if the invention is realized beyond those limits, and when embodiments are found to be without any unexpected characteristics, those embodiments are within the meaning of the term about as used herein. It is not difficult for the artisan or others to determine whether such an embodiment is either as expected or, because of either a break in the continuity of results or one or more features that are significantly better than reported by the inventor, is surprising and thus an unobvious teaching leading to a further advance in the art.

BRIEF DESCRIPTION OF THE DRAWING

FIG. 1 is a perspective view of a typical fiber forming position in a forming room showing the device or apparatus of the invention.

FIG. 2 is a partial cross section of a one of many conventional pad wheels used in an embodiment of the in the invention.

DETAILED DESCRIPTION

Figure 3:
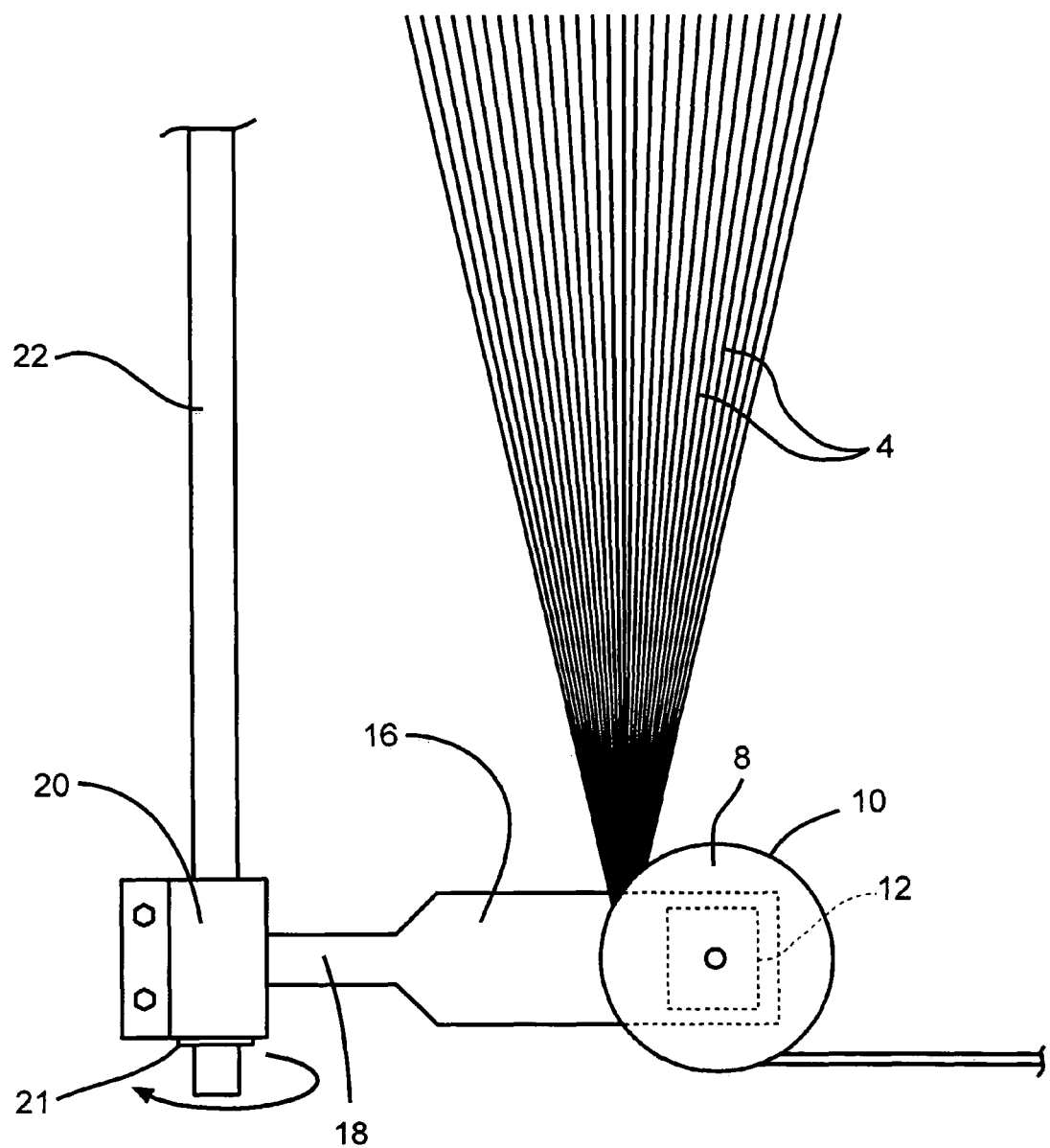
FIG. 3 is a front view showing how the device of the invention is mounted beneath a bushing.

FIG. 1 is a perspective view of a typical bushing position for making fibers from a molten material. Molten material from a conventional source enters a bushing 2 that produces, during fiberizing mode, a plurality of fibers 4. The fibers 4 are normally moving at a high speed, over 1000 feet per minute and often many thousands of feet per minute. In many fiber operations, but not all, typically the fibers have been sprayed with water to cool the fibers and are then optionally contacted with an optional, conventional chemical sizing applicator 5 that applies a conventional protective sizing composition to the surface of the fibers to protect the fibers from abrasion and to make the fibers perform better in a later application as is well known.

Dry, wet or sized fibers 6 are then gathered into a strand 9 with a driven pad wheel assembly 7, according to the invention, comprising a pad wheel 8, typically having a V or U shaped groove 10 in its outer periphery. The pad wheel 8 is driven with a servo motor 12 having a shaft (not shown) that passes through a hole 14 centered around the axis of the pad wheel 8. A conventional key (not shown) sets in a key slot 15 in the pad wheel 8 and the shaft of the servo motor 12 to prevent the pad wheel turning on the shaft of the servo motor. Other means of securing the pad wheel on the shaft of the servo motor as is well known.

The driven pad wheel assembly 7, as shown in FIG. 3 is mounted in a conventional manner to an arm and a vertical pipe that allows the pad wheel assembly 7 to be rotated out of the way for working on the bushing or sizing applicator. The servo motor 12 is mounted on a plate 16, which in turn supports the pad wheel assembly 7. The plate 16 is attached to an arm 18 that is attached to a swivel 20 mounted on a vertical member 22, usually a pipe secured to a structural member (not shown) in the ceiling of the fiber forming room. A retainer ring 21 is clamped or threaded onto the pipe 22 at the appropriate vertical position to hold the swivel 20 on the vertical member 22.

The servo motor 12 is a low voltage motor requiring a voltage of less than about 48 volts. A 24 volt, direct current, servo motor is very suitable, such as Model No. AKM12E-BNMNR-00 available from KOLLMORGEN located in Northhampton, Mass.

In the method of the invention, when a breakout sensor senses that the bushing is braking out, the signal from the sensor activates a controller for the pad wheel motor 12, or drive, and slows the shaft speed of the motor 12, according to a desired deacceleration rate programmed into the controller, to a very slow RPM, such as about 20 RPM. Later, when the operator starts the primary fibers from the hanging bushing into a puller such as a winder or chopper, or when the breakout sensor senses that the bushing is in a desired fiberization mode, the controller for the motor accelerates the servo motor 12, according to a desired ramp-up rate programmed into the controller, to an RPM similar to the surface speed of the good product fiber strand in contact with the pad wheel 8, such as a minimum of about 2000 RPM. This ramp-up can be triggered by a breakout detector, a switch that the operator throws, the chopper or winder controller or some other sensor.

Breakout detectors are well known as disclosed above in the Background section. Deceleration of the pad wheel should occur very soon after the beginning of a breakout to prevent wheel wraps. By very soon is meant within about 10 seconds after the beginning of a breakout. The rate of deceleration should be very fast, such as about 400 RPM/second. Many different rates of acceleration are suitable for the motor driving the pad wheel 8 and will vary depending upon many variables including the diameter of the groove in the pad wheel, the type of sizing on the fiber, the number and diameter of fibers being produced, the material of the pad wheel. A typical acceleration rate such as about 400 RPM/second is typical.

Use of the invention reduces maintenance costs, frees up the operator to address other important needs because wheel wraps are eliminated or substantially reduced. Also, motor maintenance is greatly reduced compared to using 110 volt AC motors. The breakout rate is significantly reduced, i.e. a longer average desired fiberization time vs hanging time. With a lower break rate comes a significant improvement in product quality.

Different embodiments employing the concept and teachings of the invention will be apparent and obvious to those of ordinary skill in this art and these embodiments are likewise intended to be within the scope of the claims. The inventor does not intend to abandon any disclosed inventions that are reasonably disclosed but do not appear to be literally claimed below, but rather intends those embodiments to be included in the broad claims either literally or as equivalents to the embodiments that are literally included.

The invention claimed is:

1. A method for fiberizing a molten material comprising flowing molten glass into a bushing comprising an orifice plate or a tip plate containing a plurality of orifices therein to form fibers and pulling the fibers during fiberization against a motor driven pad wheel at a speed of at least 1000 ft./min. to form a strand of fibers, the improvement comprising that the motor is a servo motor driven at a shaft speed of at least about 2000 RPM during fiberization by a voltage of less than about 50 volts, the RPM of the shaft of the servo motor being deaccelerated at a desired rate by a servo motor controller upon a breakout of the fibers coming from the bushing and then accelerated at a desired rate to at least about 2000 RPM by the servo motor controller when the bushing is once again in a fiberization mode.

2. The method of claim 1 wherein the RPM of the servo motor shaft is rapidly decelerated, after a breakout sensor has indicated that the bushing has started to break out, to a shaft speed of about 20 RPM or less.

3. The method of claim 1 wherein the RPM of the servo motor shaft is accelerated at a rate after fiberization has resumed at a rate within a range of about 200 RPM/second to about 600 RPM/second, to a magnitude such that the strand contacting surface speed of a strand contacting portion of the driven pad wheel is within 20 percent of the pulling speed of the fibers.

4. A motor driven pad wheel assembly for contacting a strand of fibers moving at a speed of at least about 1000 ft./min., the pad wheel assembly comprising a pad wheel and a motor having a shaft that turns the pad wheel when the shaft turns, the improvement comprising that the motor is a servo motor and the voltage requirement of the motor is less than about 50 volts and further comprising a programable controller that, after receiving a signal from a one or more sensors, can rapidly deaccelerate the RPM of the servo motor shaft at a desired rate to an RPM of about 20 RPM or less and then accelerate the servo motor shaft at a desired rate to an RPM of 2000 or more.

5. The motor driven pad wheel assembly of claim 4 wherein said one or more sensors sense a hanging mode and also a fiberization mode of a fiberizing bushing.

6. The motor driven pad wheel assembly of claim 4 wherein the voltage is about 24 volts DC.

7. The motor driven pad wheel assembly of claim 5 wherein the voltage is about 24 volts DC.

8. The method of claim 1 wherein the voltage is about 24 volts DC.

9. The method of claim 2 wherein the voltage is about 24 volts DC.

10. The method of claim 1 wherein the voltage is about 24 volts DC.

11. The method of claim 2 wherein the RPM of the servo motor shaft is accelerated at a rate after fiberization has resumed that is within a range of about 200 RPM/second to about 600 RPM/second to a magnitude that a strand contacting surface speed of the driven pad wheel is within 20 percent of the pulling speed of the strand of fibers.

12. The method of claim 11 wherein the voltage is about 24 volts DC.

13. A method for fiberizing a molten material comprising flowing molten glass into a bushing comprising an orifice plate or a tip plate containing a plurality of orifices therein to form fibers and pulling the fibers during fiberization at a pulling speed exceeding 1000 ft./min. against a strand contacting portion of a motor driven pad wheel to form a strand of fibers, the improvement comprising that the motor is a servo motor driven by a voltage of less than about 50 volts, wherein the RPM of the servo motor shaft is rapidly decelerated to a level of about 20 RPM or less after the bushing has started to break out and accelerated at a rate after fiberization has resumed that is within a range of about 200 RPM/second to about 600 RPM/second to a magnitude such that a strand contacting surface speed of the driven pad wheel is within 20 percent of the pulling speed of the strand of fibers.

14. The method of claim 13 wherein the voltage is about 24 volts DC.

* * * * *